United States Patent
Isenmann

(10) Patent No.: US 9,591,314 B2
(45) Date of Patent: Mar. 7, 2017

(54) METHOD FOR THE COMPRESSED STORAGE OF GRAPHICAL DATA

(71) Applicant: VEGA Grieshaber KG, Wolfach (DE)

(72) Inventor: Andreas Isenmann, Haslach i.K. (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 14/765,485

(22) PCT Filed: Mar. 14, 2014

(86) PCT No.: PCT/EP2014/055100
§ 371 (c)(1),
(2) Date: Aug. 3, 2015

(87) PCT Pub. No.: WO2014/146981
PCT Pub. Date: Sep. 25, 2014

(65) Prior Publication Data
US 2015/0365683 A1  Dec. 17, 2015

(30) Foreign Application Priority Data

Mar. 18, 2013  (EP) .................................... 13159763

(51) Int. Cl.
*H04N 19/182* (2014.01)
*H04N 19/132* (2014.01)
*H04N 19/167* (2014.01)

(52) U.S. Cl.
CPC ......... *H04N 19/182* (2014.11); *H04N 19/132* (2014.11); *H04N 19/167* (2014.11)

(58) Field of Classification Search
CPC ........................... H04N 19/182; H04N 19/162
See application file for complete search history.

(56) References Cited

U.S. PATENT DOCUMENTS

| | | | |
|---|---|---|---|
| 6,486,981 | B1 | 11/2002 | Shimura et al. |
| 2002/0114525 | A1 | 8/2002 | Bolle et al. |
| 2009/0010328 | A1* | 1/2009 | Pan ...................... H04N 19/115 375/240.08 |

(Continued)

FOREIGN PATENT DOCUMENTS

| | | |
|---|---|---|
| EP | 1 154 574 | 11/2001 |
| EP | 2 226 615 | 9/2010 |
| WO | 2013/017387 | 2/2013 |

OTHER PUBLICATIONS

Varma et al., "Application of Quad Tree for Low Bitrate Compression", IEEE CISP2012 Proceedings 104, Mar. 2, 2012, pp. 104-108.

(Continued)

*Primary Examiner* — Jaison Joseph
(74) *Attorney, Agent, or Firm* — Fay Kaplun & Marcin, LLP

(57) ABSTRACT

During the compression of digital image data, the desired level of detail, therefore the compression level, is defined at different values "for different image regions". The definition of the level of detail can be automatic and/or controlled by the user. As a result of this it can be achieved for more interesting image regions to be less compressed or not at all compressed, whereas less interesting image regions are greatly compressed.

11 Claims, 2 Drawing Sheets

(56) References Cited

U.S. PATENT DOCUMENTS

| | | | | |
|---|---|---|---|---|
| 2010/0150425 A1* | 6/2010 | Kalteis | ............... | G05B 19/4183 |
| | | | | 382/141 |
| 2011/0069884 A1 | 3/2011 | Zhang et al. | | |
| 2011/0262051 A1* | 10/2011 | Morard | .................... | H04N 1/41 |
| | | | | 382/244 |
| 2015/0046125 A1* | 2/2015 | Jagiella | ............... | G01M 99/005 |
| | | | | 702/184 |

OTHER PUBLICATIONS

Deforges et al., "Color LAR Codec: A Color Image Representation and Compression Scheme Based on Local Resolution Adjustment and Self-Extracting Region Representation", IEEE Transactions on Circuits and Systems for Video Technology, vol. 17, No. 8, Aug. 2007, pp. 974-987.

Lee et al., "EEG Data Compression Using Cut and Align Beats Approach and 2-D Transforms," IEEE Transactions on Biomedical Engineering, vol. 46, No. 5, May 1999, pp. 556-564.

Bosl, "Multiside Data Reduction with Flexible Saliency Criterion for Biological Image Analysis," 31$^{st}$ Annual International Conference of the IEEE EMBS, Minneapolis, Minnesota, USA, Sep. 2-6, 2009, pp. 3703-3706.

"7. Other Intraframe Techniques. 2: Quadtree, Multiresolution and Neural Approaches," in: Clark "Digitalk Compression of Still Images and Video," Academic Press, UK, Jan. 1, 1995, XP-002523234, pp. 195-205.

"16.2 Region of Interest Encoding," in: Taubman et al., "JPEG2000 Image Compression Fundamentals, Standard and Practice," Kluwer Academic Publisher, NL, Jan. 1, 2004, XP-002442377, pp. 637-641.

\* cited by examiner

METHOD FOR THE COMPRESSED STORAGE OF GRAPHICAL DATA

FIELD OF THE INVENTION

The invention relates to level, pressure or flow measuring technology. In particular, the invention relates to a method for level, pressure or flow measuring, to a processor for performing such a method, to a measuring device with such a processor, to a control device with such a processor, to a programming element and to a computer-readable medium.

BACKGROUND

Modern field devices in the field of level, pressure or flow measuring generate or require graphical data with a high level of detail. This, however, results in the generated or required digital images having a large memory space requirement. In particular, if greater quantities of images are to be transmitted to a measuring unit the amount of data can become a problem.

For example, a level sensor using the radar or guided microwave measurement principle can thus transmit the echo curves required for measured value acquisition to a measuring unit as a series of individual images.

SUMMARY OF THE INVENTION

According to a first aspect of the invention, a method for level, pressure or flow measurement is disclosed. In the method, firstly measured data are collected and a digital image made up of a large number of pixels is generated from the collected measured data, a level, pressure or flow being readable from the digital image. Furthermore, a desired first level of detail of a first image region of the digital image is determined. Moreover, a desired second level of detail of a second image region of the digital image is determined, the first level of detail being different from the second level of detail. Afterwards, a compression of the first image region takes place by a first factor which reflects the first level of detail. Likewise, a compression of the second image region takes place by a second factor, which reflects the second level of detail.

In other words therefore, the first image region and the second image region are compressed by different factors, i.e. at different "rates" depending on the desired level of detail.

If the desired level of detail of the first image region is high then this first image region is only compressed slightly or, under certain circumstances, not at all. If, on the other hand, the desired level of detail of the second image region is low, for example because the user is not particularly interested in the second image region, then this second image region is compressed by a high factor, therefore "greatly" compressed.

Therefore, at least one image region of the digital image is thus stored in a compressed manner, it being possible to store certain important regions of the image with as much detail as possible depending on the desired amount of detail (level of detail) of the region concerned.

Different resolutions are therefore used in order to store important and less important image regions. As a result, the important regions of the image can remain very detailed in a targeted manner.

A key aspect of the invention is that the digital image is compressed by regions of increased user interest ("important regions") being stored at a high resolution and other regions ("less important regions") being stored at a lower resolution.

In process measuring technology, predominantly bus systems with low transmission rates are in use. Therefore, in addition to the saving of memory space, the minimisation of the bus load by the transmission of compressed image information is advantageous.

In particular, the digital image can be a measurement curve which was recorded by a measuring device, for example by a level measuring device. In this case the measurement curve can be an echo curve.

According to one embodiment of the invention, for each pixel of the digital image, the level of detail that the image region relating to said pixel should have is determined.

For example, the user can select a specific image region (and thus a specific group of pixels) and assign this image region the level of detail he desires. In the simplest case, there can be just two levels of detail: high resolution and low resolution. If the user is interested in the selected image region, he can assign it the "high resolution" level of detail. He can then, for example, select a further region and also assign this one the "high resolution" level of detail, etc. The remaining image regions can then be automatically classified by the system as "low resolution".

The reverse case is also possible: the user selects an image region and classifies it as "low resolution". He can then select further image regions and classify these as "low resolution". The system then assigns the remaining image regions a high level of detail ("high resolution").

The digital image data are then compressed, the image regions classified as high resolution being compressed by a low factor or not at all and the image regions classified as low resolution being compressed by a high factor.

It is possible in the process for the desired level of detail of the digital image to be stored for every pixel in the digital dataset.

It is also possible for neighbouring pixels to be combined into a pixel group and for the level of detail which this pixel group should have to be stored in the digital dataset.

According to one embodiment of the invention, the desired first and/or second level of detail is determined from the settings on the measurement device when the measured data are collected.

It is also possible for the program that carries out the method to perform an analysis of the image and, for example, recognise specific image regions and classify the associated image regions as regions with a high level of detail.

According to a further embodiment of the invention, the desired first and/or second level of detail is determined by the user before the generation/recording of the digital image. The levels of detail can also be determined by the user after the generation/recording of the digital image.

It is also possible for the user to look at the digital image on his measurement device or on the computer after its creation and to mark the image regions that are of interest to him or are not of much interest to him using a selection function and to define their level of detail.

According to a further aspect of the invention, these different methods for selecting image regions and for determining the corresponding levels of detail can be combined with each other. It is therefore possible, for example, for the measuring device software to determine and classify specific image regions itself and in addition for the user to correct this classification and/or define and classify further image regions.

In particular, the level, pressure or flow measuring device can be designed to divide up the different image regions of the digital image, which are acquired from the measured data, automatically into various classes. For example, two classes can be provided, those image regions which are assigned to the first class being compressed by the first factor and those image regions which are assigned to the second class being compressed by the second factor.

In particular, the digital image can be a measurement curve, for example an echo curve, which was created by the level measuring device from the measured data. The classification of the different image regions can be carried out fully automatically by the measurement device such that ultimately different sections of the measurement curve can be compressed by different compression factors. Afterwards, the compressed or partly compressed measurement curve can be transmitted to the measuring unit.

In particular, it can also be provided for the measuring device to fully automatically set the corresponding compression factors. This can all occur before the measured data and the digital image of the measurement curve generated therefrom are transmitted to the measuring unit. As a result of this, memory space in the measuring device and the amount of data to be transmitted can be reduced effectively.

For example, it can be provided for the level measuring device to identify the fill level echo in the echo curve and to compress the image region in which the fill level echo lies by a low compression factor or not at all, whereas the remaining image regions are compressed by a higher compression factor. It can also be provided for the measuring device to identify further echoes in the echo curve and likewise only compress them slightly or not at all. In contrast, all remaining image regions are compressed by the higher compression factor, such that the data quantity of the digital image is reduced accordingly.

According to a further embodiment of the invention, the first compression factor not only reflects the first level of detail and the second compression factor not only reflects the second level of detail, but rather also the colours of the pixels surrounding the relevant pixels of the image region. The compression is therefore greater the more pixels of the same colour are arranged next to one another.

According to a further aspect of the invention, a processor for performing the method described above and hereinafter is disclosed.

According to a further aspect of the invention, a digital camera with such a processor is disclosed.

According to a further aspect of the invention, a measuring device with such a processor is disclosed. The measuring device can, in particular, be a level measuring device, a flow measuring device or a pressure measuring device.

According to a further aspect of the invention, a control device of the process measurement technology having such a processor is disclosed. The control device is, for example, a control device of a level measuring device, a flow measuring device or a pressure measuring device, which is connected via a bus or a wireless communications connection to the measuring device in order to receive measured data from the measuring device and to parameterise the measuring device.

In particular, the control device can be a modular evaluation and operating device, which can be fitted onto a measuring device. In the field of level measurement, the control device can be designed in the manner of a PLIC-SCOM device.

The processor can quite generally be designed for digital image processing and as well as the use in a camera can also be used in other systems, for example for the compressed storage of digital x-ray images in medical technology or for images of measurement curves, which have been captured by sensors, for example in the field of level measurement. The method can, as described further above, also be used to compress images from the user interface for devices in measurement technology.

According to a further aspect of the invention, the use of a method described above and hereinafter for compressing images of the user interface in the field of level measurement is disclosed.

According to a further aspect of the invention, the use of a method described above and hereinafter for compressing images of measurement curves in the field of level measurement is disclosed.

According to a further aspect of the invention, a program item is disclosed, which, when it is carried out on a processor, instructs the processor to carry out the method described above and hereinafter.

According to a further aspect of the invention, a computer-readable medium is disclosed, on which a program item is stored, which, when it is executed on a processor, instructs the processor to carry out the method described above and hereinafter.

In the process, the program element can, for example, be part of a piece of software that is stored on a processor. Furthermore, this embodiment comprises a computer program element, which already uses the invention right from the start as well as a computer program element, which causes an existing program to use the invention by means of an update.

Embodiments of the invention are described below with reference to the drawings.

BRIEF DESCRIPTION OF THE DRAWINGS

The drawings are schematic and not to scale.
If the same reference numerals are used in different drawings in the description of the drawings hereinafter, then these denote identical or similar elements. Identical or similar elements can, however, also be denoted by different reference numerals.

DETAILED DESCRIPTION OF EMBODIMENTS

Figure 1:
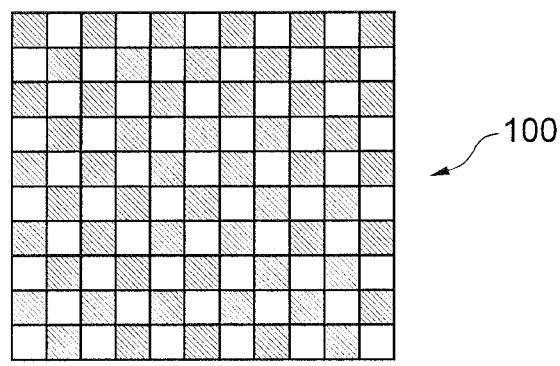
FIG. 1 shows an image with 11×10 pixels.

FIG. 1 shows an image composed of 11×10 pixels. The depth of colour of the image amounts, for example, to 8 bits. The total memory required for storing the digital image on a storage medium is therefore 110×3 bytes (RGB)=330 bytes.

The image can now be stored in a certain file format in compressed form. A distinction is made in the process between lossless and lossy compression methods. For example, the compression is carried out on the basis of neighbouring pixels with the same or similar colour.

When a digital image is generated by the camera, the photographer selects a place in the image which should be focused, for example. This is where the sharpness should be and in this region in the digital image the highest level of detailed information is desired. The other image regions of the image, which are outside of this range, are for example not stored with this level of detail.

Also when generating images with software, it can be that parts of the image to be generated should be kept with as much detail as possible and other regions are not to be stored with so much detail under certain circumstances. Such processing software can provide the option of defining image regions with the required level of detail.

The resolution of the compressed digital image (pixels per inch) can be varied across the whole image region and the desired resolution (level of detail) can be controlled automatically for each individual image region by the software and/or user before compression. For this purpose, not only the colour value is stored for each pixel, but also its current and/or desired amount of detail in this image region.

This information can be used to store the unsharp or less important image regions at a lower resolution and the sharp or more important image regions at a higher resolution.

Figure 2:
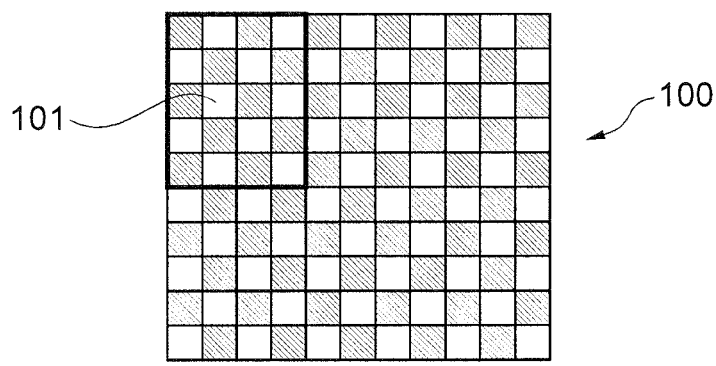
FIG. 2 shows the image from FIG. 1 with one selected image region.

FIG. 2 shows the digital image from FIG. 1, the upper left region 101, which comprises 4×5 pixels, being selected. The region 101 of the digital image 100 should be retained with more detail than the remaining region of the image. In other words, a higher level of detail is defined for the region 101 and a lower level of detail for the remaining region.

Figure 3:
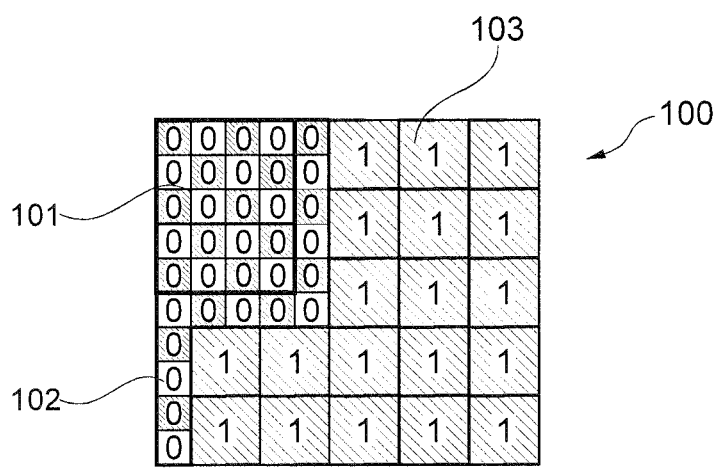
FIG. 3 shows an example of a two-level compression of this image.

FIG. 3 shows an example of a two-level compression of the digital image data. Whether the pixel should be high resolution (0) or not (1) is stored for every pixel. For this purpose, an additional storage bit is required. During compression, the originally defined important image region 101 has to be expanded at its borders under certain circumstances in order to arrive at "whole multiples" (see region 102). This is necessary so that no gaps in or overlaps of the image information occur at the border of the high-resolution region.

Since the image region 103 was defined as an image region with a low level of detail, the number of pixels here is reduced to a quarter. The memory required now amounts to 53×(3 bytes (RGB)+1 bit for the level of detail information)=166 bytes.

Figure 4:
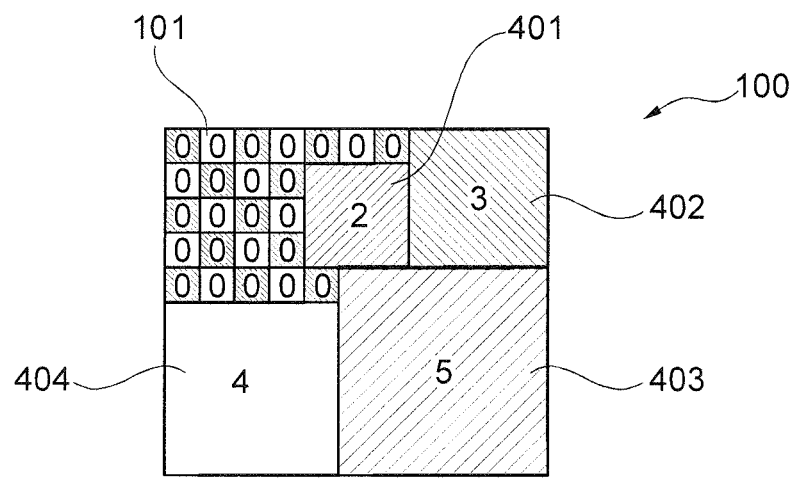
FIG. 4 shows an example of a higher level compression of the image.

FIG. 4 shows an example of a multi-level compression where six different levels of detail are provided. Fewer or more levels of detail can, of course, also be provided. In region 101 (the region with the highest level of detail) the image data are not compressed. In region 401, 9 pixels are condensed to 1 pixel. In region 402, 16 pixels are condensed to 1 pixel. In region 404, 25 pixels are condensed to 1 pixel and in region 403, 36 pixels are condensed to 1 pixel.

Here too the resolution is stored for each pixel. The number of bits needed for this depends on the number of the desired levels of resolution. In the example of FIG. 4, six resolution levels (levels of detail) are used (level 1 not having been assigned to an image region). 3 bits are required for this.

In total therefore 28 pixels are left over. The memory requirement is therefore 28×(3 bytes (RGB)+3 bits for the six resolution levels)=95 bytes.

The compressed images shown should only be regarded as examples. An appropriate algorithm, which calculates the number of remaining squares and the resultant total memory requirement taking into consideration different resolution levels, can be used to determine the optimum compression.

Figure 5:
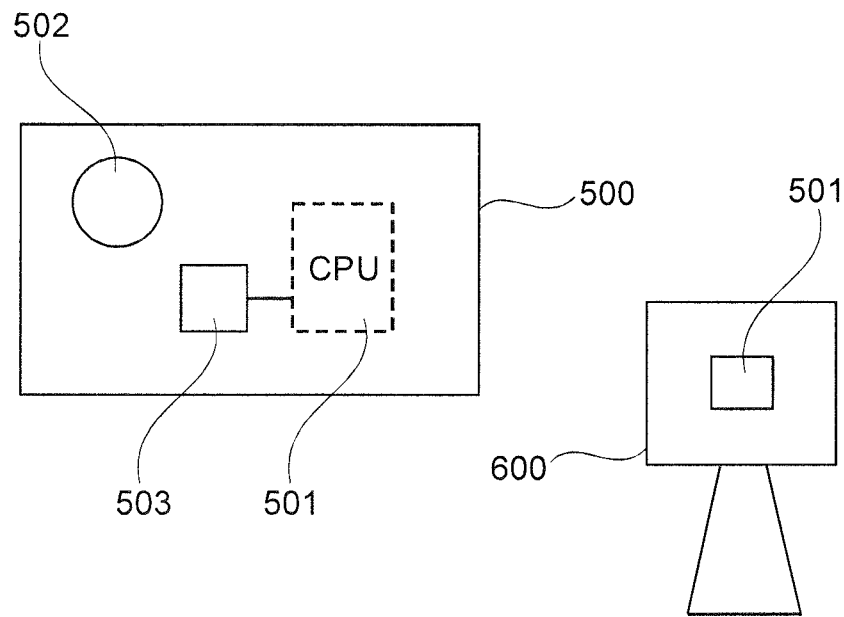
FIG. 5 shows a digital camera and a level measurement device, each with a processor according to an embodiment of the invention.

FIG. 5 shows a camera 500 having a processor 501 and a lens 502. The camera records a digital image and the processor processes the digital image. The image that is compressed by the processing can then be stored on a storage device 503.

The camera 500 can be a digital photo camera or also an x-ray detector with corresponding image processing electronics, which is used for medical examinations or technical investigations.

Furthermore, a level measuring device 600 is shown, which has a processor 501 described above. The processor can, for example, compress the image of the measurement curve before the image data are sent to a control device. It is also possible for the processor to compress the image for a user interface, which is to be shown on a display of an evaluation and operating device or a PC.

In addition, it should be pointed out that "comprising" and "having" do not rule out any other elements or steps and that "a" or "an" do not rule out a plurality. Moreover, it should be pointed out that features or steps, which have been described with reference to one of the above embodiments, can also be used in combination with other features or steps of other embodiments described above. Reference numerals in the claims are not to be regarded as limitations.

The invention claimed is:

1. A method for measuring of a fill level, comprising the steps of:
   capturing measured data;
   generating a digital image of an echo curve, the digital image being made up of a large number of pixels from the captured measured data, wherein the fill level is, determinable from the digital image;
   identifying a fill level echo in the echo curve;
   determining a desired first level of detail of a first image region of the digital image, the first image region comprising the fill level echo;
   determining a desired second level of detail of a remaining second image region of the digital image, wherein the first level of detail is higher than the second level of detail;
   compressing the first image region by a first factor, which reflects the first level of detail;
   compressing the second image region by a second factor, which is higher than the first factor, and which reflects the second level of detail; and
   transmitting the compressed digital image to a control device.

2. The method according to claim 1, further comprising:
   for each pixel of the digital image, determining the level of detail that an image region corresponding to this pixel should have.

3. The method according to claim 1, further comprising:
   storing the desired level of detail for each pixel of the digital image.

4. The method according to claim 1, further comprising:
   determining one of the desired first level and the desired second level of detail from one of (a) settings of a camera when taking the digital image and (b) settings of a measuring device during the capture and/or processing of the measured data recorded by the measuring device.

5. The method according to claim 1, further comprising:
   determining one of the desired first level and the desired second level of detail by the user before one of generating and recording the digital image.

6. The method according to claim 1, further comprising:
   determining one of the desired first level and the desired second level of detail by the user after one of the generation and recording of the digital image.

7. The method according to claim 1, wherein the first and the second compression factors reflect the respective first or second level of detail and colors of the pixels surrounding the corresponding pixels of the image region.

8. A device, comprising:
a processor;
a memory operably coupled to the processor; and
a data storage device operably coupled to the processor, the data storage device storing computer program instructions, which when executed by the processor, cause the processor to perform a method comprising the steps of:
capturing measured data;
generating a digital image of an echo curve, the digital image being made up of a large number of pixels from the captured measured data, wherein a fill level is determinable from the digital image;
identifying a fill level echo in the echo curve;
determining a desired first level of detail of a first image region of the digital image, the first image region comprising the fill level echo;
determining a desired second level of detail of a remaining second image region of the digital image, wherein the first level of detail is higher than the second level of detail;
compressing the first image region by a first factor, which reflects the first level of detail; and
compressing the second image region by a second factor, which is higher than the first factor, and which reflects the second level of detail,
wherein the device is configured to transmit the compressed digital image to a control device.

9. The device according to claim 8, wherein the device is a measuring device.

10. The device according to claim 8, wherein the device is one of a level measuring device.

11. A non-transitory computer-readable medium, on which a program element is stored and which, when it is executed on a processor, instructs the processor to carry out comprising the steps of:
capturing measured data;
generating a digital image of an echo curve, the digital image being made up of a large number of pixels from the captured measured data, wherein a fill level is determinable from the digital image;
determining a desired first level of detail of a first image region of the digital image, the first image region comprising the fill level echo;
determining a desired second level of detail of a remaining second image region of the digital image, wherein the first level of detail is higher than the second level of detail;
compressing the first image region by a first factor, which reflects the first level of detail;
compressing the second image region by a second factor, which is higher than the first factor, and which reflects the second level of detail; and
transmitting the compressed digital image to a control device.

* * * * *